United States Patent [19]

Soriente

[11] Patent Number: 5,028,322
[45] Date of Patent: Jul. 2, 1991

[54] LOW PROFILE UNDERDRAIN STRAINER ASSEMBLY WITH IMPROVED DISTRIBUTION/FASTENING MEANS

[75] Inventor: Alfonse J. Soriente, Westfield, N.J.
[73] Assignee: The Graver Company, Union, N.J.
[21] Appl. No.: 378,261
[22] Filed: Jul. 11, 1989
[51] Int. Cl.$^5$ .............................................. B01D 29/88
[52] U.S. Cl. .................................. 210/232; 210/289; 210/291; 210/293
[58] Field of Search ............... 210/232, 274, 275, 279, 210/289, 291, 292, 450, 460, 456, 495, 293, 541

[56] References Cited

U.S. PATENT DOCUMENTS

| | | | |
|---|---|---|---|
| 688,312 | 12/1901 | Jewell | 210/291 |
| 739,621 | 9/1903 | Selg et al. | 210/460 |
| 1,689,308 | 10/1928 | Stickney | 210/279 |
| 2,622,739 | 12/1952 | Nilsson | 210/292 |
| 3,081,877 | 3/1963 | Jakobs et al. | 210/293 |
| 3,378,858 | 4/1968 | Jacuzzi | 210/169 |
| 3,730,348 | 5/1973 | Weis et al. | 210/274 |
| 3,762,559 | 10/1973 | Knoy et al. | 210/293 |
| 3,826,375 | 7/1974 | Fournier | 210/291 |
| 4,084,750 | 4/1978 | Fett | 210/293 |
| 4,102,790 | 7/1978 | Portyrata | 210/293 |
| 4,435,286 | 3/1984 | Louboutin et al. | 210/274 |
| 4,476,020 | 10/1984 | Cheetham | 210/289 |
| 4,514,298 | 4/1985 | Wall et al. | 210/450 |
| 4,608,168 | 8/1986 | Moore | 210/279 |
| 4,707,257 | 11/1987 | Davis et al. | 210/274 |

FOREIGN PATENT DOCUMENTS 2852316  11/1979  Fed. Rep. of Germany ...... 210/293

OTHER PUBLICATIONS

Literature entitled "Graver Roto Scour Underdrain Systems".
Literature entitled "Concrete Mono-Pak Filter".

Primary Examiner—Robert A. Dawson
Assistant Examiner—Joseph Drodge
Attorney, Agent, or Firm—Dressler, Goldsmith, Shore, Sutker & Milnamow, Ltd.

[57] ABSTRACT

A strainer assembly for use in a filter having a granular media bed supported above a floor. The strainer assembly includes a low profile body member having a two tiered construction, the bottom tier having a larger diameter than the upper tier. Each of the tiers has a series of substantially equally spaced apart, generally vertical, slot openings formed therein. The total area of the openings in the bottom tier is from about 3 to 15 times greater than the total area of the openings in the upper tier. An improved distribution/fastening means is provided for directing fluid through the body member and for retaining the body member in position above the floor.

9 Claims, 2 Drawing Sheets

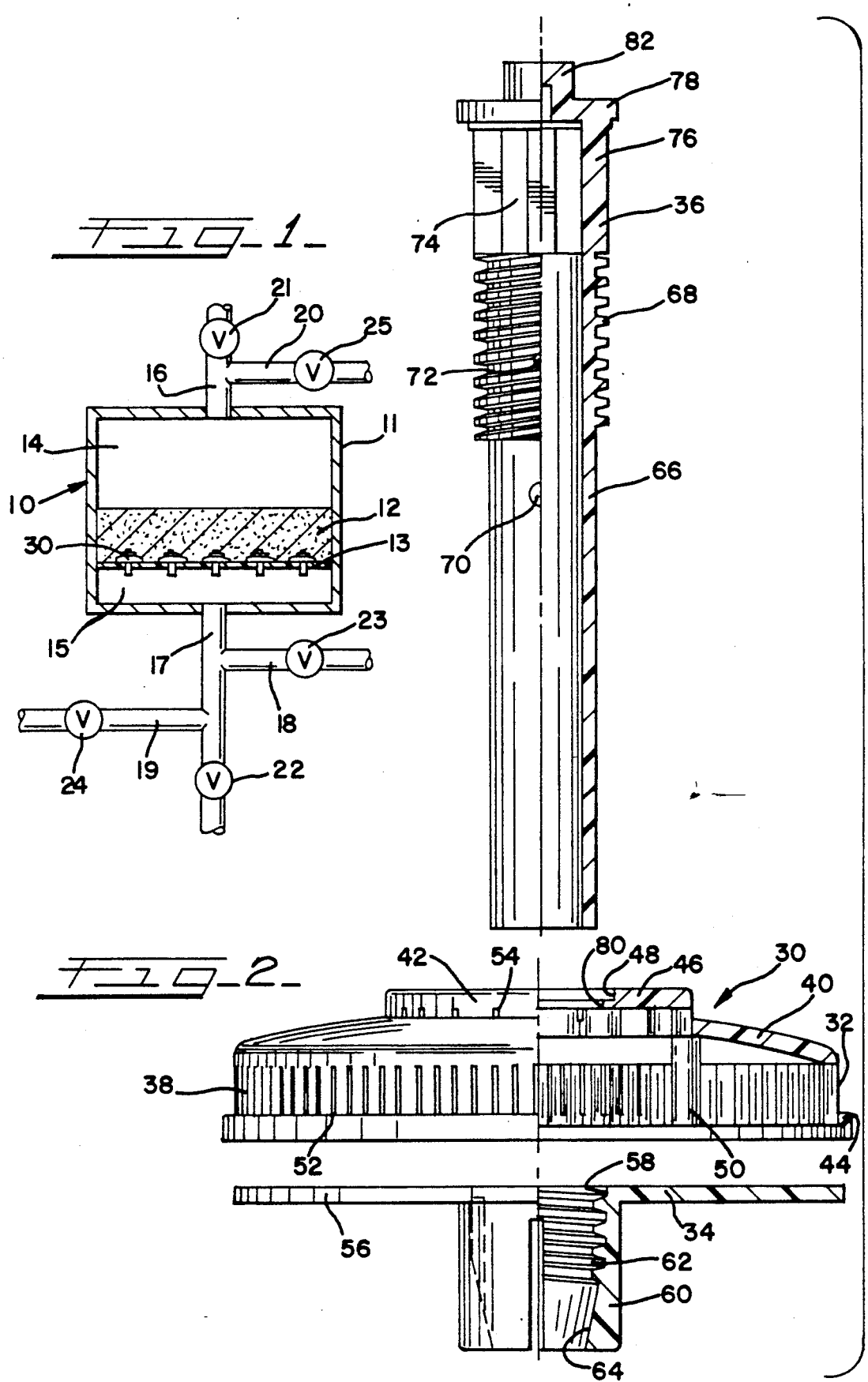

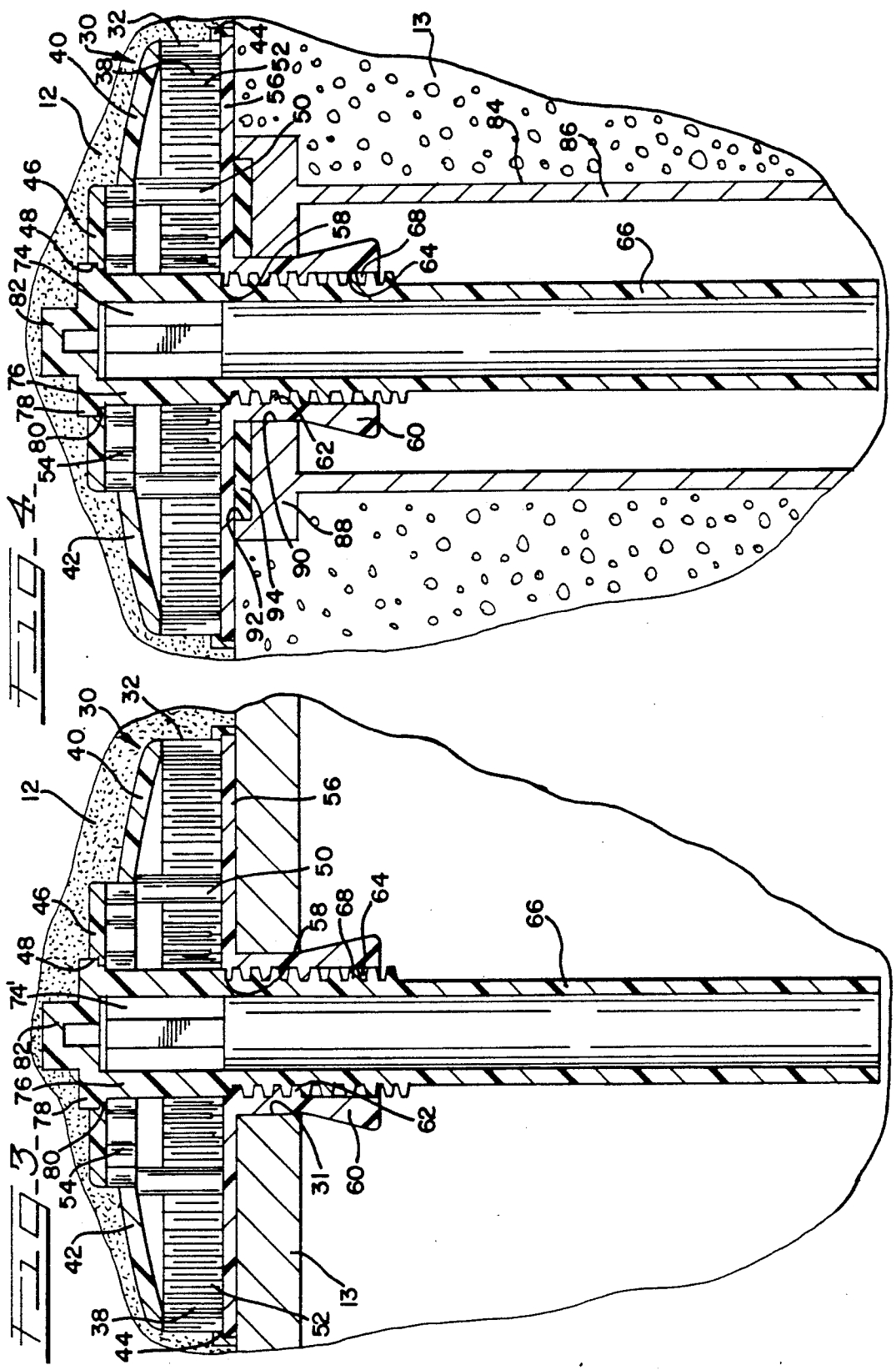

LOW PROFILE UNDERDRAIN STRAINER ASSEMBLY WITH IMPROVED DISTRIBUTION/FASTENING MEANS

FIELD OF THE INVENTION

The present invention relates to an improved underdrain strainer assembly for use in a liquid filter or demineralizer of the type having a granular media filter bed through which the liquid to be treated flows downwardly therethrough.

BACKGROUND OF THE INVENTION

Granular media filters and demineralizers, as used extensively for the purification of water, typically comprise a carefully graded particulate media filter bed of sand, anthracite, ion exchange resins etc., which filter bed is supported above a floor positioned in a filter tank so as to divide the tank into an inlet chamber thereabove and an outlet chamber therebelow. In use, as the water to be treated is passed downwardly through the filter bed, the suspended solids and/or dissolved impurities are removed and retained within the granular media. Periodically, it is necessary to remove the suspended solids collected in the filter bed by backwashing the filter bed so as to preclude the filter bed from clogging and ceasing to properly function or to regenerate an exhausted ion exchange resin bed. Backwashing is conventionally achieved by passing backwash water upwardly through the filter media, preferably proceeded by or accompanied by a backwash gas such as air.

The collection of filtrate and the distribution of backwash air and/or water is commonly achieved by specially designed strainers or underdrain distributors which are received through openings in the floor of the filter tank and connect with pipes or a plenum space beneath the floor. It is particularly advantageous that the underdrain distributors fit closely to the floor and that they uniformly distribute the backwash air and/or water over the entire area of the filter bed. Examples of prior art stainers and underdrain distributors are described in U.S. Pat. Nos. 3,730,348, 4,214,992 and 4,707,237.

While the heretofore proposed strainers and underdrain distributors have been effective in directing backwash air and/or water upwardly through the filter bed, they have resulted in a "jetting" action causing the deposition of the lighter upper layer of the filter media bed to work its way down around the strainers resulting in high pressure drops through the strainers and possible media leakage during the service cycle. Such strainers have also required the use of a greater number of smaller strainers spaced a short distance apart to avoid dead spots which creates distribution problems and increases the cost.

SUMMARY OF THE INVENTION

In accordance with the present invention, an improved strainer assembly is provided that incorporates a low profile body member having a two tiered construction, the bottom tier having a larger diameter than the upper tier. Each of the tiers has a series of substantially equally spaced apart, generally vertical, slot openings formed therein. The total area of the openings in the bottom tier is from about 3 to 15 times greater than the total area of the openings in the upper tier in order to provide good liquid and gas distribution. The relatively low profile of the body member assures good cleaning of the filter media down to the floor.

The present invention also provides an improved distribution/fastening means for directing a fluid therethrough into the body member and for retaining the body member in position above the floor.

The present invention is also intended for use in deep bed demineralizers that include a filter bed of ion exchange resins supported above a floor.

The invention, both as to its construction and method of operation, will be understood by reference to the following description taken in conjunction with the accompanying drawings.

DESCRIPTION OF THE DRAWINGS

FIG. 1 is a schematic elevational view, partially in cross section, illustrating a filter incorporating the strainer assembly of the present invention.

FIG. 2 is an exploded elevational view, partially in cross section, showing a preferred embodiment of a strainer assembly constructed in accordance with the invention.

FIG. 3 is a cross sectional elevational view of the strainer assembly illustrated in FIG. 2 as assembled in connection with a strainer plate.

FIG. 4 is a cross sectional view similar to FIG. 3 illustrating the strainer assembly in connection with a concrete floor.

DESCRIPTION OF PREFERRED EMBODIMENTS:

Referring now to the drawings, and more particularly to FIG. 1, there is illustrated a simplified exemplary filter 10 utilizing an underdrain strainer assembly of the present invention. Filter 10 has a filter bed 12 through which the influent liquid to be treated is passed during the service cycle to remove solid foreign materials or dissolved impurities therefrom. Treated effluent liquid from filter 10 is passed to service. After filter bed 12 has become clogged with foreign particles removed from the influent liquid or the bed has become exhausted, a backwash cycle is initiated wherein pressurized gas and/or backwash water is passed upwardly therethrough to dislodge foreign matter in bed 12 and/or to classify the bed.

More specifically, filter 10 comprises a filter tank 11 having a false bottom steel plate or concrete floor 13 dividing tank 11 into an inlet chamber 14 thereabove and an outlet or underdrain chamber 15 therebelow. Filter bed 12 of suitable filter media, such as sand, anthracite, ion exchange resin or the like, is supported in inlet chamber 14 above floor 13. An inlet pipe 16 extends into and communicates with inlet chamber 14 to direct influent raw liquid into chamber 14. An outlet pipe 17 communicates with outlet chamber 15 to direct the effluent liquid from chamber 15 to service. A gas scour inlet pipe 18, has one end thereof in fluid communication with outlet pipe 17 and the other end thereof in fluid communication with a source of pressurized gas (not shown). A backwash inlet pipe 19 has one end thereof in fluid communication with outlet pipe 17 and the other end thereof in fluid communication with a backwash liquid storage tank (not shown). A transfer pipe 20 communicates with inlet pipe 16 to carry backwash liquid from chamber 14 Conventional control valves 21, 22, 23, 24 and 25 are associated respectively with pipes 16, 17, 18, 19 and 20 to control fluid flow therethrough.

A plurality of underdrain strainer assemblies 30, embodying features of the present invention, are secured to and extend through openings 31 formed in floor 13. Referring to FIGS. 1-3, strainer assembly 30, constructed in accordance with a preferred embodiment of the invention, includes a hollow strainer body member 32, a base plate member 34 and a distribution/fastening member 36.

Strainer body member 32 is formed so as to define a substantially cylindrical bottom portion 38, a substantially horizontal annular portion 40 and a substantially cylindrical upper portion 42. Annular portion 40 extends between the upper edge of bottom portion 38 and the lower edge of upper portion 42. The lower end of bottom portion 38 is open and is formed with a rim portion 44 about the lower edge thereof. The upper end of upper portion 42 is closed by an annular portion 46 having an opening 48 formed therein. In accordance with a preferred embodiment of the invention the outer diameter of the bottom portion is about 5.62 inches and the outer diameter of the upper portion 42 is about 3.0 inches. A plurality of substantially vertical support posts 50 extend between the lower surface of annular portion 40 adjacent the inner edge thereof to an elevation substantially equal to the elevation of the bottom portion 38.

A first series of substantially equally spaced apart generally vertical slot openings 52 are formed through bottom portion 38 and a second series of substantially equally spaced apart generally vertical slot openings 54 are formed through upper portion 42. The total area of the openings 52 is from about 3 to 15 times the total area of the openings 54. In accordance with one preferred embodiment of the invention the total area of the openings 52 is about 8 times the total area of the openings 54. There are approximately 100 of openings 52 and approximately 16 openings 54, with the openings 52 being approximately 0.5 inches long and 0.08 inches wide and the openings 54 being approximately 0.25 inches long and 0.08 inches wide.

Base plate member 34 includes an upper annular portion 56 having an opening 58 formed therein. The outer diameter of portion 56 is such as to permit receipt thereof in rim portion 44, as best seen in FIG. 3. An expanding split ring member 60 extends downwardly from portion 56 in vertical alignment with opening 58. The upper portion of ring member 60 is formed with internal threads 62 and the lower portion thereof is formed with spaced apart inwardly extending surfaces 64.

Distribution/fastening member 36 includes an open ended tubular portion 66 having external threads 68 formed adjacent the upper end portion thereof. A metering opening 70 is formed in tubular portion 66 a short distance below the threads 68 and a weep opening 72 is formed in tubular portion 66 through the threads 68. The upper portion of distribution/fastening member 36 includes open areas 74 separated by longitudinal spacers members 76 extending from the upper edge of tubular portion 66 to a stepped retaining flange portion 78. Flange portion 78 is dimensioned to be received in a stepped recess portion 80 associated with opening 48. The upper surface of flange portion 78 is formed with a suitable gripping portion 82 for receipt of a gripping means, such as a hand wrench, for selective rotation of member 36.

Referring to FIG. 4, the strainer assembly 30 is shown installed in a thick concrete floor 13. The strainer assembly 30 is received in an insert 84 that is cast into the concrete floor. Insert 84 includes a tubular portion 86 that is closed off at its upper end by an annular upper portion 88 defining an opening 90. A central section of the upper portion 88 is formed with a recess 92. The upper surface of upper portion 88 is at substantially the same elevation as the upper surface of floor 13. A suitable flexible gasket member 94 is received in recess 92. Opening 90 corresponds to opening 31 of the embodiment shown in FIG. 3 and the discussion of the assembly and installation of strainer assembly 30 that follows is also applicable to this embodiment.

Referring to FIGS. 2 and 3, the assembly of members 32, 34 and 36 to form strainer assembly 30 and the installation of same to floor 13 will now be discussed. Strainer body member 32 and base plate member 34 are assembled together by positioning portion 56 of base plate member 34 in the recess defined by rim portion 44. This assembly is then positioned on top of floor 13 with split ring member 60 extending through opening 31 and the bottom surface of portion 56 in contact with the upper surface of floor 13. The distribution/fastening member 36 is then pushed down through opening 48 into ring member 60. As the leading end of member 36 contacts surfaces 64 the ring member 60 is caused to split apart along preselected lines causing the bottom portions to flare outwardly and thereby firmly secure base plate member 34 in place above floor 13. Member 36 is then rotated by using a hand wrench received about gripping portion 82, which in turn causes the external threaded portion 68 to be received by internal threaded portion 62. The continued rotation of member 36 causes it to move downward until retaining flange 78 is tightly received in recessed portion 80 so as to firmly secure body member 32 to base plate member 34.

In operation of filter 10, during the filtering or service cycle, valves 21 and 22 are open and valves 23, 24 and 25 are closed. Influent liquid passes through inlet pipe 16 into inlet chamber 14 and then passes downwardly through filter bed 12. The filtered liquid passes through openings 52 and 54 into body member 32 and then through openings 74 and tubular portion 66 into outlet chamber 15 and out through outlet pipe 17 to service. After filter bed 12 has become clogged with foreign particles removed from the raw liquid and/or exhausted in the case of an ion exchange resin filter bed, a backwash cycle is initiated. During the backwash cycle, a backwash liquid is passed upwardly through the filter media. The backwash liquid is typically accompanied with or preceded by an upward flow of a backwash gas such as air. While the description of the backwash cycle which follows shall be to a system wherein the backwash liquid is accompanied with the backwash air scour, the present invention contemplates that the backwash liquid and backwash air may be separately passed through the filter bed if circumstances warrant.

The backwash cycle is initiated by opening valves 23, 24 and 25 and closing valves 21 and 22. A pressurized gas, such as air, is bubbled through pipes 18 and 17 into underdrain chamber 15. The backwash air and backwash water separate in underdrain chamber 15 forming an upper air chamber and a lower water chamber. Metering opening 70 and weep opening 72 are sized such that the height of the air chamber below floor 13 is a predetermined distance below opening 70 for a given combination of air flow and water flow rate into chamber 15. The air is metered through openings 70 and 72 and the water rises through the tubular portion 66 of distribution/fastenings member 36. The air and water are mixed in the upper portion of member 36. The mixture of air and backwash liquid is directed through openings 74 in member 36 into body member 32 and then outwardly through openings 52 and 54 so as to be uniformly distributed upwardly through the filter bed 12. The air passing through the filter bed agitates the bed and causes the foreign particles which have collected therein to become disengaged from the filter media. The upward flow of backwash liquid through the bed removes the disengaged foreign material accumulated therein. The air and backwash liquid, along with the disengaged foreign material, are removed from tank 11 through transfer pipe 20 to a drain (not shown). It should be noted that tubular portion 66 may shortened if air scour is not utilized.

Strainer assembly 30, constructed in accordance with the invention, with the dual diameter and levels of openings 52 and 54 and the ratio of the areas of such openings as described above, effectively eliminates the creation of a "jetting" action during the backwash cycle and results in good liquid and gas distribution which is essential for good operation at lower pressure drops and good filter media distribution. The low profile of the strainer body portion 32 also assures good cleaning of the filter media down to the floor 13.

The filter assembly 10, as disclosed above is for exemplary purposes and should not be construed to indicate that the strainer assembly 30 disclosed therewith does not have utility in conjunction with other types of filtering apparatus. While the embodiments described herein are at present considered to be preferred, it will be understood that various modifications and improvements may be made therein and it is intended to cover in the appended claims all such modifications and improvements as fall within the true spirit and scope of the invention.

What is claimed is:

1. A filter having a granular media bed supported above a floor defining an inlet chamber therebelow and a strainer assembly extending through said floor, said strainer assembly comprising:
    (a) a low profile hollow strainer body member having a substantially closed upper end and a substantially open bottom end in facing relationship to an opening formed in the floor, said body member having a substantially cylindrical bottom portion in which a first series of substantially equally spaced generally vertical slot openings are formed about the periphery thereof and a substantially cylindrical upper portion in which a second series of spaced apart generally vertical slot openings are formed about the periphery thereof, said cylindrical bottom portion having a diameter that is larger than the diameter of said cylindrical upper portion and being connected to said cylindrical upper portion by a substantially horizontal annular transition portion that extends between the upper edge of said bottom cylindrical portion and the lower edge of said upper cylindrical portion such that said first series of openings are located substantially outwardly and a short distance below said second series of openings so as to form a strainer assembly that has a width that is substantially greater than its height, said second series of openings being located at the lower end of said upper portion adjacent to said annular transition portion, said body member having a substantially horizontal upper annular portion that extends inwardly from the upper edge of said upper cylindrical portion; and
    (b) a base plate member positioned in closing relationship to said bottom end of said body member, said base plate member having an opening formed thereon in communication with the opening in the floor, said base plate member having a ring member extending downwardly from said opening formed therein and into the opening in the floor, said upper annular portion having an opening formed therein substantially in vertical alignment with said ring member.

2. The strainer assembly as defined in claim 1 wherein the total area of the openings in said first series is greater than the total are of the openings in said second series of openings.

3. The strainer assembly as defined in claim 1 further including a distribution/fastening member for directing a fluid therethrough from the outlet chamber into said body member and for retaining said body member and said base plate member in position above the floor.

4. The strainer assembly as defined in claim 3 wherein said distribution/fastening member includes a substantially tubular portion extending downwardly through the opening in said upper cylindrical portion and through said ring member.

5. The strainer assembly as defined in claim 4 wherein said tubular portion has external threads formed about an intermediate portion thereof that are received by internal threads formed in said ring member.

6. The strainer assembly as defined in claim 5 wherein said ring member is an expanding split ring disc such that the threaded receipt of said tubular portion therein causes the lower portion thereof to expand and thereby retain said base plate member in contact with the upper surface of the floor.

7. The strainer assembly as defined in claim 6 wherein the upper end of said tubular member is formed with a retaining flange that contacts an upper surface of said body member such that the threaded receipt of said tubular portion in said ring member causes said body member to be retained in place above said base plate member.

8. The strainer assembly as defined in claim 7 wherein the upper end of said tubular portion is formed with means for facilitating the rotation of said tubular portion.

9. The strainer assembly as defined in claim 4 wherein said tubular portion has an open lower end and openings formed through at an upper portion thereof in fluid communication with the inside of said body member.

* * * * *